US011386273B2

(12) United States Patent
Misra et al.

(10) Patent No.: US 11,386,273 B2
(45) Date of Patent: Jul. 12, 2022

(54) SYSTEM AND METHOD FOR NEGATION AWARE SENTIMENT DETECTION

(71) Applicant: International Business Machines Corporation, Armonk, NY (US)

(72) Inventors: Amita Misra, San Jose, CA (US); Jalal Mahmud, San Jose, CA (US); Saurabh Tripathy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/687,098

(22) Filed: Nov. 18, 2019

(65) Prior Publication Data

US 2021/0149995 A1 May 20, 2021

(51) Int. Cl.
| | |
|---|---|
| *G06F 40/30* | (2020.01) |
| *G06N 20/00* | (2019.01) |
| *G06N 3/08* | (2006.01) |
| *G06F 40/247* | (2020.01) |
| *G06N 5/04* | (2006.01) |
| *G06N 3/04* | (2006.01) |
| *G06F 40/205* | (2020.01) |
| *G06F 40/242* | (2020.01) |
| *G06F 40/253* | (2020.01) |

(52) U.S. Cl.
CPC ............ *G06F 40/30* (2020.01); *G06F 40/205* (2020.01); *G06F 40/242* (2020.01); *G06F 40/247* (2020.01); *G06F 40/253* (2020.01); *G06N 3/0445* (2013.01); *G06N 3/08* (2013.01); *G06N 5/04* (2013.01); *G06N 20/00* (2019.01)

(58) Field of Classification Search
CPC ...... G06F 40/30; G06F 40/205; G06F 40/247; G06F 40/289

USPC .................................................. 704/9, 2, 270
See application file for complete search history.

(56) References Cited

U.S. PATENT DOCUMENTS

| | | | |
|---|---|---|---|
| 8,352,405 B2 | 1/2013 | Fang et al. | |
| 8,725,495 B2 | 5/2014 | Peng et al. | |
| 10,019,437 B2* | 7/2018 | Ho | G06F 40/30 |
| 2010/0046770 A1* | 2/2010 | Chan | H04R 3/005 |
| | | | 381/94.1 |
| 2011/0125734 A1* | 5/2011 | Duboue | G09B 7/00 |
| | | | 707/723 |

(Continued)

FOREIGN PATENT DOCUMENTS

| | | | |
|---|---|---|---|
| CN | 108009297 A | 5/2018 | |
| CN | 108647335 A | 10/2018 | |

OTHER PUBLICATIONS

An Approach to Sentiment Analysis Using Lexicons With Comparative Analysis of Different Techniques (Year: 2016).*
Distinguishing between facts and opinions for sentiment analysis: Survey and challenges (Year: 2017).*
Geli Fei et al., A Dictionary-Based Approach to Identifying Aspects Implied by Adjectives for Opinion Mining, Proceedings of Coling, Dec. 2012.

(Continued)

*Primary Examiner* — Akwasi M Sarpong
(74) *Attorney, Agent, or Firm* — Terrile, Cannatti & Chambers, LLP; Emmanuel A. Rivera

(57) ABSTRACT

A method, system and computer-usable medium are disclosed for sentiment detection based on applying an antonym dictionary to a natural language processing (NLP) system. A binary classifier is trained to predict negation cues, where a constituency parse tree is used to create rules for scope detection. The trained binary classifier, a list of conversational negation terms, and a list of antonyms are used to annotate content that considers negation cues and scope for the created rules.

20 Claims, 5 Drawing Sheets

(56) References Cited

U.S. PATENT DOCUMENTS

| | | | | |
|---|---|---|---|---|
| 2014/0019122 | A1* | 1/2014 | New | G06F 40/279 |
| | | | | 704/9 |
| 2014/0163962 | A1* | 6/2014 | Castelli | G06F 40/216 |
| | | | | 704/9 |
| 2016/0140588 | A1* | 5/2016 | Bracewell | G06Q 30/0204 |
| | | | | 705/7.33 |
| 2016/0246779 | A1* | 8/2016 | Ho | G06F 40/30 |
| 2018/0357220 | A1* | 12/2018 | Galitsky | G06N 5/022 |
| 2018/0365334 | A1* | 12/2018 | Semlani | H04L 67/20 |
| 2019/0005027 | A1* | 1/2019 | He | G06N 20/00 |
| 2019/0347326 | A1* | 11/2019 | Kozhaya | G06F 40/35 |
| 2020/0327191 | A1* | 10/2020 | Lev-Tov | G06F 40/284 |
| 2020/0342054 | A1* | 10/2020 | Cason | G06F 40/279 |
| 2021/0027016 | A1* | 1/2021 | Ji | G06F 40/216 |
| 2021/0287691 | A1* | 9/2021 | Rudberg | G10L 21/0216 |

OTHER PUBLICATIONS

Nishantha Medagoda et al., Sentiment Lexicon Construction Using SentiWordNet 3.0, IEEE 2015 11th International Conference on Natural Computation (ICNC), 2015.

Yang Shuang et al., Multi-level sentiment classification of microblog based on SVM multi-feature fusion, Study 2017.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

\* cited by examiner

SYSTEM AND METHOD FOR NEGATION AWARE SENTIMENT DETECTION

BACKGROUND OF THE INVENTION

Field of the Invention

The present invention relates in general to the field of computers and similar technologies, and in particular to software utilized in this field. Still more particularly, it relates to a method, system and computer-usable medium for improved sentiment detection in a natural language processing (NLP) system.

Description of the Related Art

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

The field of sentiment analysis/detection can refer to the use of natural language processing, text analysis, computational linguistics, and biometrics to systematically identify, extract, quantify, and study affective states and subjective information. Negation is an area of sentiment analysis/detection. Words have certain sentiment polarity, meaning their use can affect other words in certain contexts. Negation, or words that are part of negation, can be a strong polarity influencer.

Therefore, negation should be taken into consideration when designing a sentiment prediction system. For example, cue words such as "no", "not", "never", and "don't" are often used to negate a statement or an assertion that expresses a judgment or an opinion. In certain contexts, such cue words function as exclamations and not as true negations. True negation cue words and the scope of such cue words should be identified. Automatic negation scope detection systems have been proposed using different machine learning classifiers and rule-based heuristics; however, machine learning systems can require a considerable amount of labeled data. Furthermore, scope annotation can be costly and time intensive, since as scope conflicts may have to be resolved by discussion amongst and mutual agreement between expert annotators. Negation can be handled by reversing polarity of sentiment bearing based on a sentiment lexicon and prefixing the word in negation scope by the keyword "not". An issue with such prefixing is that if the same prefixed words are not exactly found in training data, the result can lead to many out of vocabulary words.

SUMMARY OF THE INVENTION

A method, system and computer-usable medium are disclosed for sentiment detection based on applying an antonym dictionary to a natural language processing (NLP) system. A binary classifier is trained to predict negation cues, where a constituency parse tree is used to create rules for scope detection. The trained binary classifier, a list of conversational negation terms, and a list of antonyms are used to annotate content that considers negation cues and scope for the created rules.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
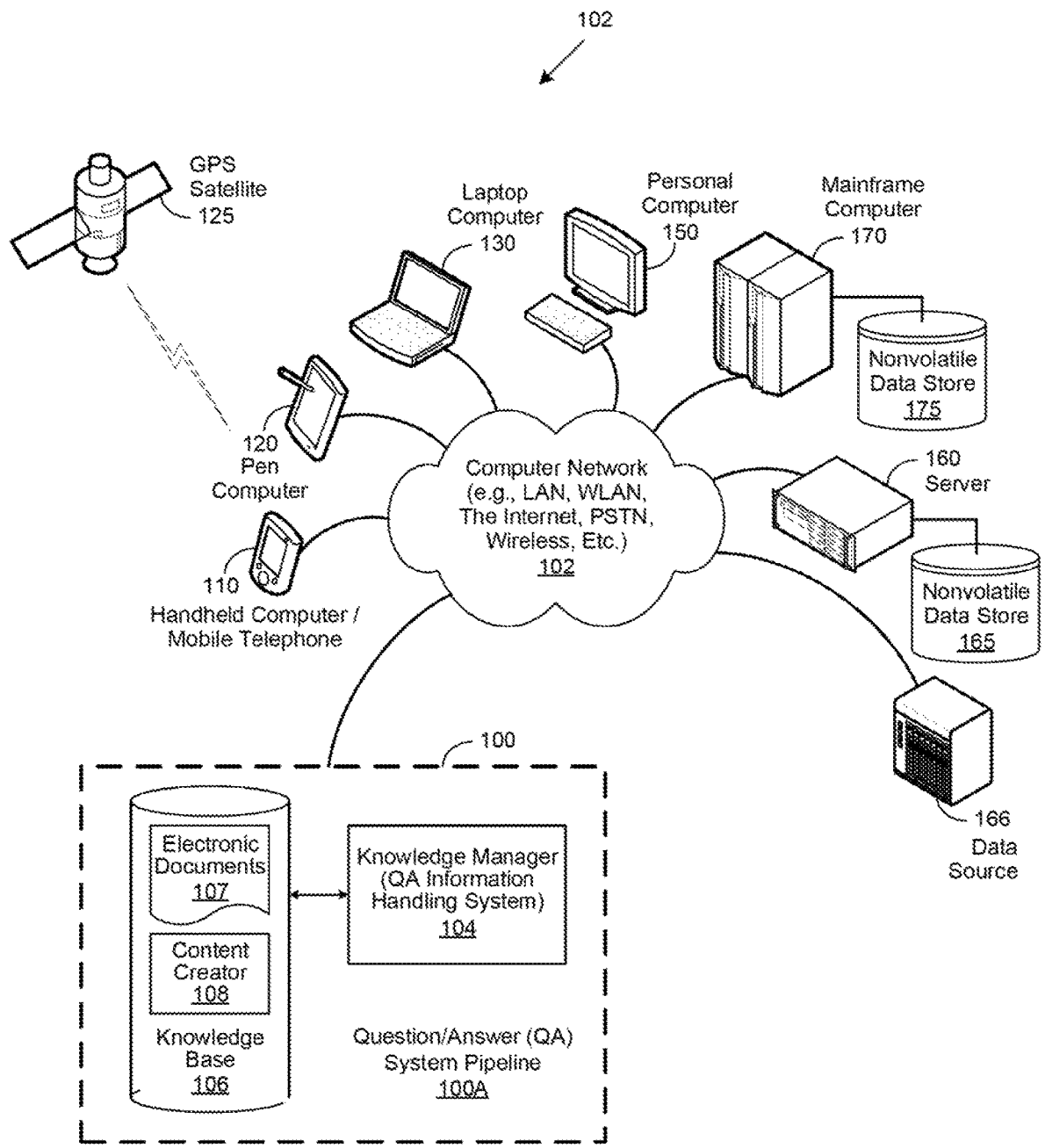
FIG. 1 depicts a network environment that includes a knowledge manager that utilizes a knowledge base.

The present application relates generally to improving sentiment detection based on applying an antonym dictionary to a natural language processing (NLP) system. Constituency trees are built. Rules are added based on semantic information, the position (i.e., node/leaf) of a negation cue word in a constituency tree, and the projection of its parent (i.e., node/leaf) based on the constituency tree structure. In certain implementations, a classifier can be run to predict if content or text (sentence, statement) contains a true negation cue word with negated scope in the content or text (sentence, statement). For predicted true negation cue words, a rule-based system can be implemented that uses both semantic information and syntactic structure.

A minimal span is annotated for scope. Scope is continuous. A noun or an adjective is negated in a noun phrase. If only the noun or adjective is being negated, then the entire clause is not annotated. Each term is considered separately (e.g., consider the example text "There are no details on the return page"). As to a verb or an adverb phrase, generally the entire phrase can be annotated, (e.g., consider the example text "I do not want to update it anymore").

Nouns in a content or text (sentence, statement) have a restricted scope which can address when words in scope are replaced with their antonyms. Replacing more than the required words with their antonyms can alter the meaning of the content or text (sentence, statement). A stricter scope for the nouns can allow the content or text (sentence, statement) to keep its meaning.

In performing negation scope detection, moving ahead in a linear order is performed on a constituency parse tree of sentence tokens (nodes, leaves), and stopped on a token (node, leaf) based on both part of speech (POS) tag from the constituency parse tree and semantic knowledge based on verb type (e.g., copula or neg-raising). In finding negation scope, the constituency parse tree is traversed in an upward direction until a parent (node, leaf) is found with the desired category label as determined by the POS tag of the token (node, leaf).

As to sentiment, negation is coupled with antonyms to get a better sentence representation for sentiment prediction. Words in negation scope are replaced by their antonym. Using antonyms can reduce the "out-of-vocabulary" words as compared to prefixing a word with "not" for learning word representations. This method implements a restricted and limited scope, since replacing all the words up to punctuation with antonyms could entirely change the sentence meaning. Predicted scopes can be derived from the scope detection model. The modified content or text (sentence, statement) representation is passed through a machine learning model for sentiment prediction.

Rules are defined to identify true negation cue words, where the scope is suited to conversational data than general review data. Implementation of knowledge and syntactic structure from constituency parse trees, an algorithm is implemented for scope detection. Results from the negation scope detection are evaluated for sentiment prediction. An antonym dictionary can be applied for sentiment analysis to a combination Convolutional Neural Network Long Short-Term Memory (CNN LSTM) architecture for sentiment analysis. The CNN LSTM architecture involves using CNN layers for feature extraction on input data combined with LSTMs to support sequence prediction.

Negation can be used to state that some event, situation, or state of affairs does not hold. A negation cue (i.e., cue word) can be an element when added to a sentence expressing a proposition, reverses the truth value of the proposition. As to negation scope, when a negative element is an operator which takes some part of content or text (sentence, statement) as its scope, that scope (i.e., negation scope) may be the entire proposition or only some part of the proposition. As to a structural level for the content or text (sentence, statement), in morphological negation, word roots are modified with a negating prefix (e.g., "dis-", "non-", or "un-") or suffix (e.g., "-less"). An example of such is "They possess an exceedingly unpleasant smell." In addition, as to a structural level for the content or text (sentence, statement), in syntactic negation, clauses are negated using explicitly negating words or other syntactic patterns that imply negative semantics. An example of such is "I do not find an option to update." Therefore, negation can have an impact on sentiment in conversations. Negation can be a polarity influencer.

The following are examples of content or text (sentence, statement), that illustrate cue words, scope and sentiment polarity. For the example content or text (sentence, statement): "@Username I don't think you do understand. Buyers and Sellers deserve to know facts, User actively prevents accurate feedback. #Misleading", the cue word is "don't", the scope is "you do understand", and the sentiment polarity is reversed (i.e., positive to→negative). For the example content or text (sentence, statement): "Have you had a chance to call/chat us? If not, we can look into options", the cue word is "not", there is no scope, and there is no change in sentiment polarity. For the example content or text (sentence, statement): "looks like I won't be able to vote because the train is running late. Awesome", the cue word is "won't", the scope is "be able", and the sentiment polarity is reversed (i.e., positive to→negative).

FIG. 1 depicts a schematic diagram of one illustrative embodiment of a knowledge manager system (e.g., a question/answer creation (QA)) system 100 which is instantiated in a distributed knowledge manager in a computer network environment 102. One example of a question/answer generation which may be used in conjunction with the principles described herein is described in U.S. Patent Application Publication No. 2011/0125734, which is herein incorporated by reference in its entirety. Knowledge manager 100 may include a knowledge manager information handling system computing device 104 (comprising one or more processors and one or more memories, and potentially any other computing device elements generally known in the art including buses, storage devices, communication interfaces, and the like) connected to a network 105. The network environment 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network environment 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, computer network 105, a knowledge base 106 which can include a corpus of electronic documents 106 or other data, a content creator 108, content users, and other possible sources of input. In various embodiments, the other possible sources of input can include location information. In one embodiment, some or all of the inputs to knowledge manager 100 may be routed through the computer network 105. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection (represented as to the network 105) and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language Processing (NLP), such that knowledge manager 100 can be considered as a NLP system, which in certain implementations performs the methods described herein. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers. In various embodiments, the one or more answers take into account location information.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds, or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. In certain embodiments, the location information is determined through the use of a Geographical Positioning System (GPS) satellite 125. In these embodiments, a handheld computer or mobile telephone 110, or other device, uses signals transmitted by the GPS satellite 125 to generate location information, which in turn is provided via the network 105 to the knowledge manager system 100 for processing. As shown, the various information handling systems can be networked together using computer network 100. Types of computer network 105 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
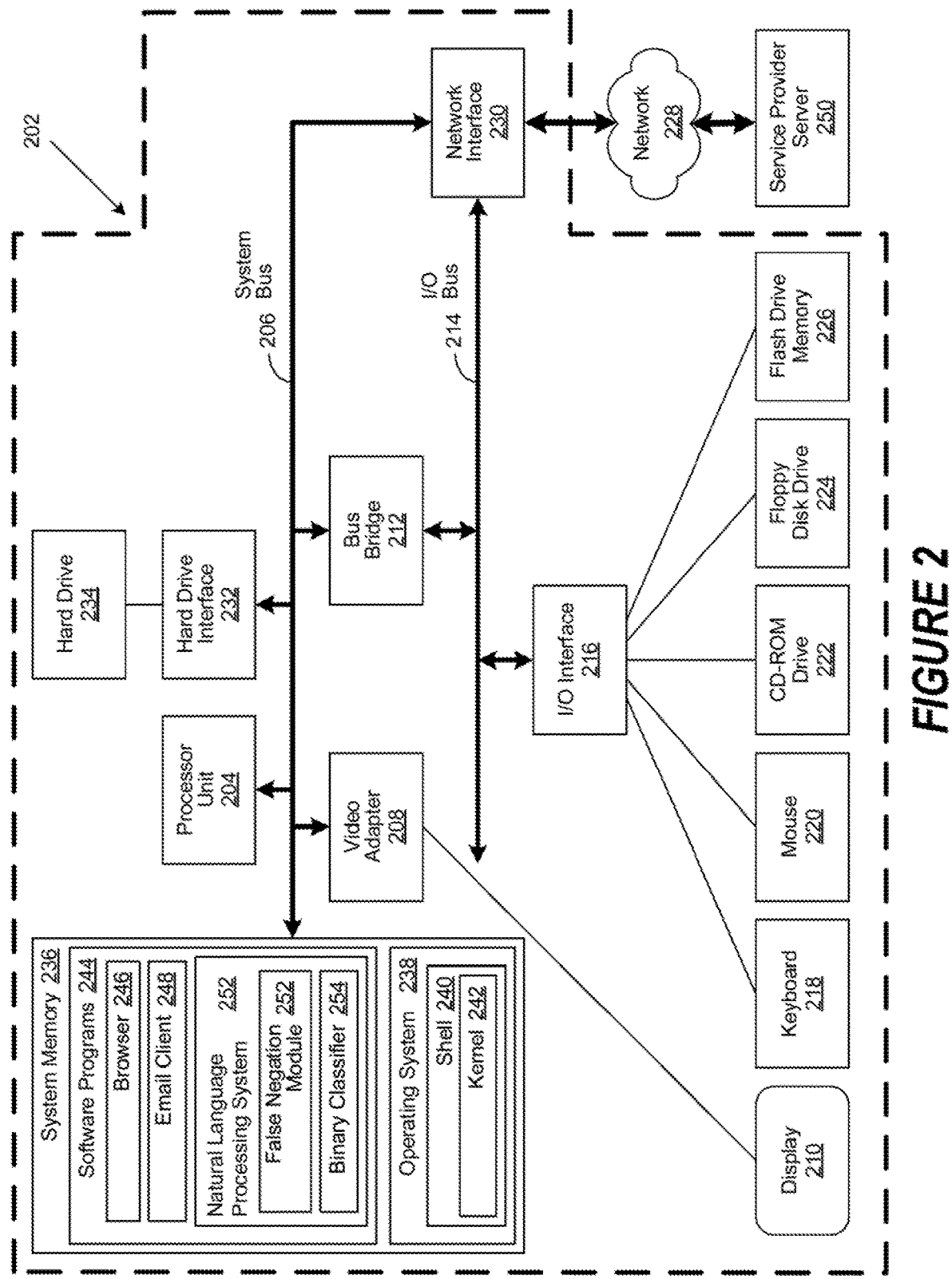
FIG. 2 is a simplified block diagram of an information handling system capable of performing computing operations.

FIG. 2 illustrates an information processing handling system 202, more particularly, a processor and common components, which is a simplified example of a computer system capable of performing the computing operations described herein. Information processing handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing information handling system 202) to send and receive network messages to the Internet using Hyper Text Transfer Protocol (HTTP) messaging, thus enabling communication with service provider server 250. In various embodiments, software programs 244 may also include a natural language processing system 252. In various implementations, the natural language processing system 252 can include a false negation module 254 and a binary classifier 256. In these and other embodiments, the invention 250 includes code for implementing the processes described herein below. In one embodiment, the information processing information handling system 202 is able to download the natural language processing system 252 from the service provider server 250.

The hardware elements depicted in the information processing information handling system 202 are not intended to be exhaustive, but rather are representative to highlight components used by the present invention. For instance, the information processing information handling system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
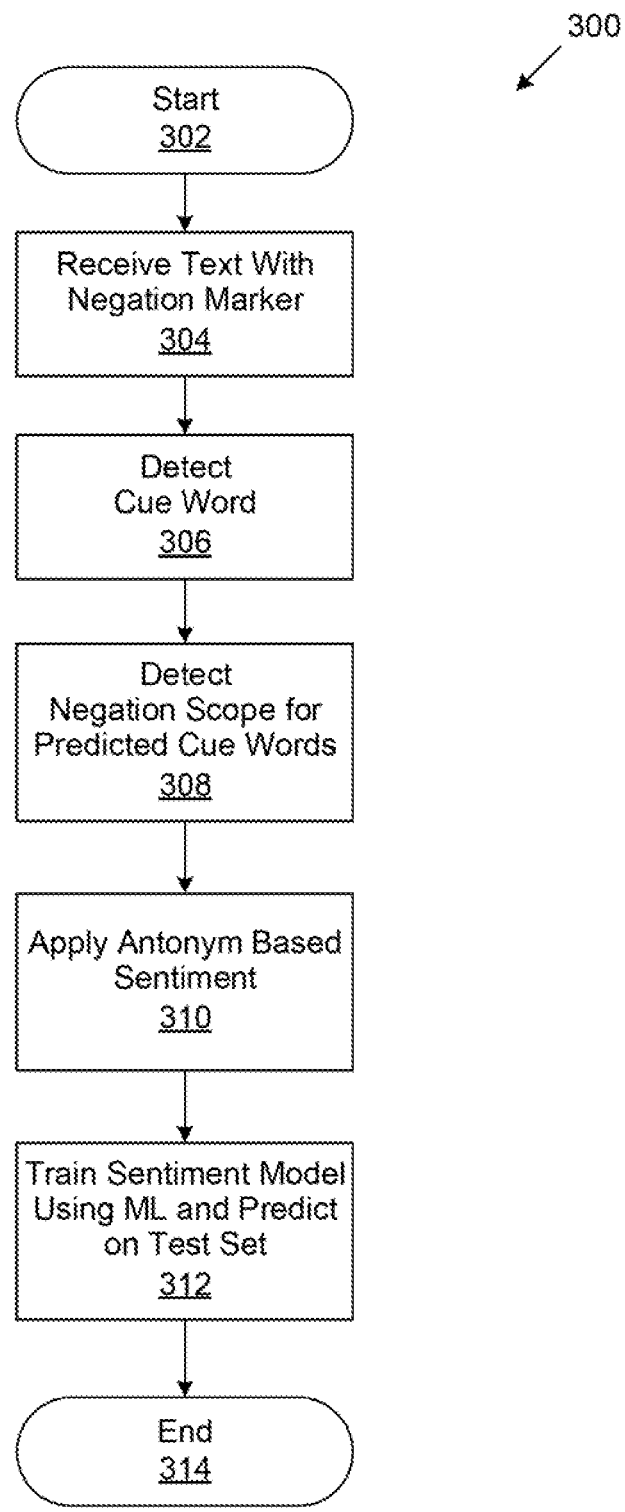
FIG. 3 is a generalized flowchart of the operation of sentiment detection in a natural language processing (NLP) system.

FIG. 3 is a generalized flowchart 300 for sentiment detection in a natural language processing (NLP) system. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302 the process 300 starts. At step 304, content or text (sentence, statement) with a negation marker is received. In certain implementations, the content or text (sentence, statement) can be part of a conversation processed by an NLP system. The content or text (sentence, statement) can include cue words such as "no", "not", "never", and "don't", etc., where such cue words can be considered as negation markers.

At step 306, cue word detection is performed. Furthermore, false negation detection is performed. In certain implementations, a machine learning (ML) model is trained. The ML model can use a binary classifier, such as a support vector machine or SVM. In machine learning, SVMs are considered as supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. A simple and fast linear SVM binary classifier can be run to determine the true negation cue words. Such an SVM binary classifier is able to consider unigrams (i.e., regard words one, bigrams (i.e., regard two words at a time), and parts of speech (POS). In particular, the SVM binary classifier determines POS bigrams and position of a cue word in a content or text (sentence, statement).

In certain implementations, the trained binary classifier, a list of conversational negation terms, and a list of antonyms are used to annotate content or text (sentence, statement) taking into consideration negation cues and scope for the created rules.

In detecting cue words, false detection can be considered. Certain negation cue words can be used in multiple senses. Therefore, the presence of an explicit cue word in a content or text (sentence, statement) does not necessarily imply that such a cue word is a negator (i.e., false negation). An example content or text (sentence, statement) is "If not, please reach out here: https:// . . . ".

In certain implementations, false negation is determined using a false negation module that does not require training data. The false negation module can receive annotated data for binary classification, as opposed to scope detection, where the binary classification is a sequence labeling task.

At step 308, negation scope for predicted cue words detection is performed. Annotate the minimal span for scope. Scope is continuous. A noun or an adjective is negated in a noun phrase. If only the noun or adjective is being negated, then the entire clause is not annotated. Each term is considered separately (e.g., consider the example content or text "There are no details on the return page"). As to a verb or an adverb phrase, generally the entire phrase can be annotated, (e.g., consider the example content or text "I do not want to update it anymore").

Constituency parse trees are created based on received content or text (sentence, statement). In certain implementations, the constituency parse trees are adjusted iteratively based on negation raising predicates, verbs, and scope assessments. The constituency parse trees of constituency grammars (i.e., phrase structure grammars) are distinguished between terminal and non-terminal nodes. The interior nodes are labeled by non-terminal categories of the grammar, while the leaf nodes are labeled by terminal categories.

Each node in the tree is either a root node, a branch node, or a leaf node. A root node is a node that does not have any branches on top of it. Within a content or text (sentence, statement), there is only one root node. A branch node is a parent node that connects to two or more child nodes. A leaf node is a terminal node that does not dominate other nodes in the tree. The leaf nodes (leaves) are the lexical tokens of the content or text (sentence, statement). A parent node is one that has at least one other node linked by a branch under it.

Figures 4A, 4B:
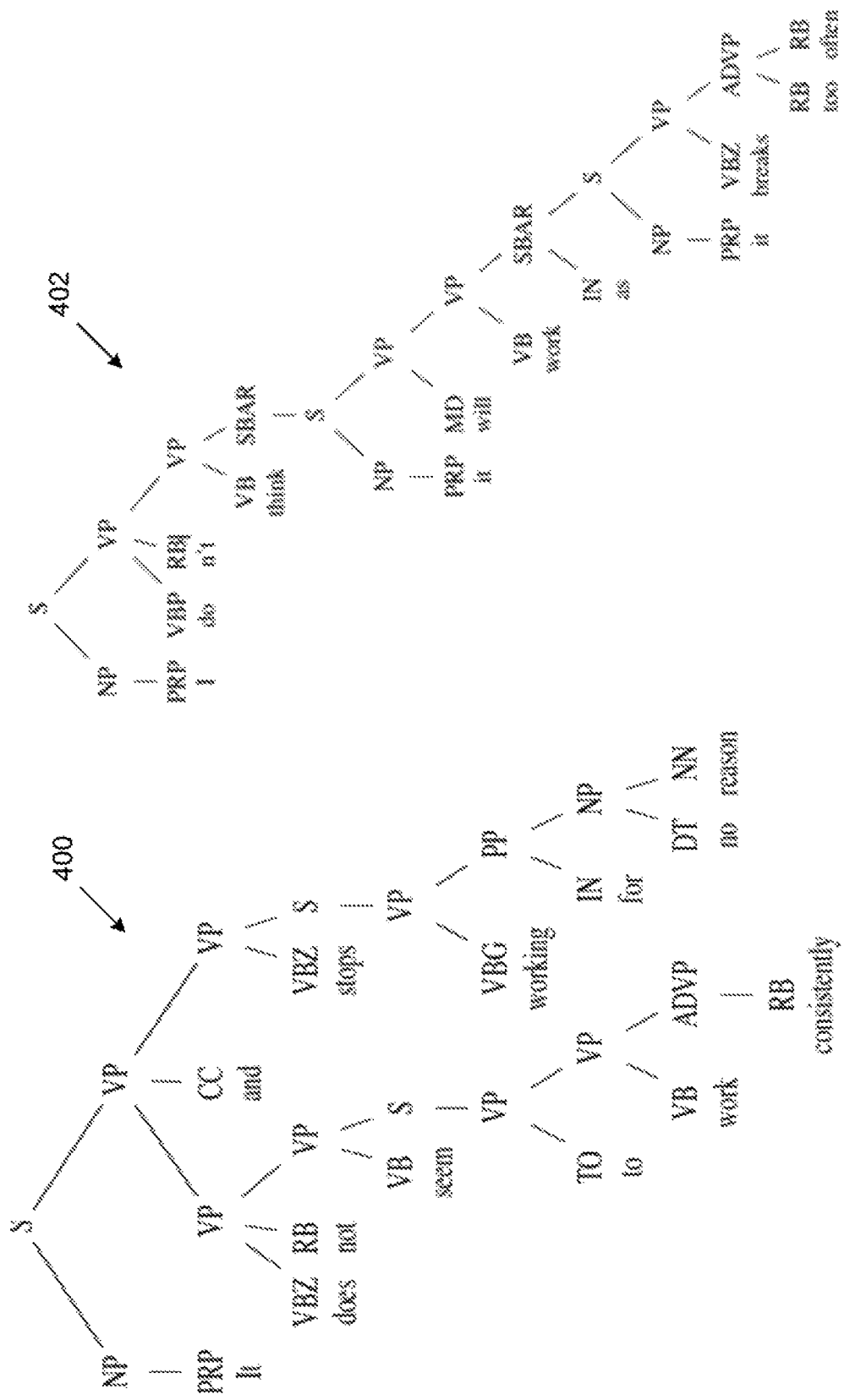
FIG. 4A is an example of a constituency parse tree.
FIG. 4B is an example of a constituency parse tree.

Referring now to FIGS. 4A and 4B, the constituency parse tree 400 of FIG. 4A represents the content or text (sentence, statement) "It does not seem to work consistently and stops for no reason". The constituency parse tree 402 of FIG. 4B represents the content or text (sentence, statement) "I don't think it will work as it breaks too often". The words of the respective content or texts (sentences, statements) are placed at particular nodes of the respective constituency parse trees.

The words of the respective content or texts (sentences, statements) are tagged as parts of speech (POS) or POS tags or labels. In particular, POS tags or labels are defined by "Bracketing Guidelines for Treebank II Style Penn Treebank Project". In the constituency parse trees 400 and 402, the following tags are illustrated. "S" defines a simple declarative clause. "NP" defines a noun phrase. "VP" defines a verb phrase. "V" defines a verb. "CC" defines coordinating conjunction. "PRP" defines a personal pronoun. "VBP" defines a verb, non $3^{rd}$ person singular present. "RB" defines an adverb. "VBZ" defines a verb, $3^{rd}$ person singular present. "VBG" defines a verb, gerund or present participle. "PP" defines a prepositional phrase. "TO" is the connecting word "to." "IN" defines a preposition or subordinating conjunction. "VB" defines a verb, base form. "ADVP" defines an adverb phrase. "DT" defines a determiner. "NN" defines a noun, singular or mass. "PRP" defines a personal pronoun. "SBAR" defines a clause introduced by a (possibly empty) subordinating conjunction. "SINV" defines an inverted declarative sentence (i.e., one in which the subject follows the tensed verb or modal). "SBARQ" defines a direct question introduced by a "wh"-word or a "wh"-phrase. "SQ" defines an inverted yes/no question, or main clause of a "wh"-question, following the "wh"-phrase in SBARQ.

The constituency parse trees are used to create rules for scope detection. The rules can be based on POS tags, category label of the parse tree, and type of verb.

Figure 5:
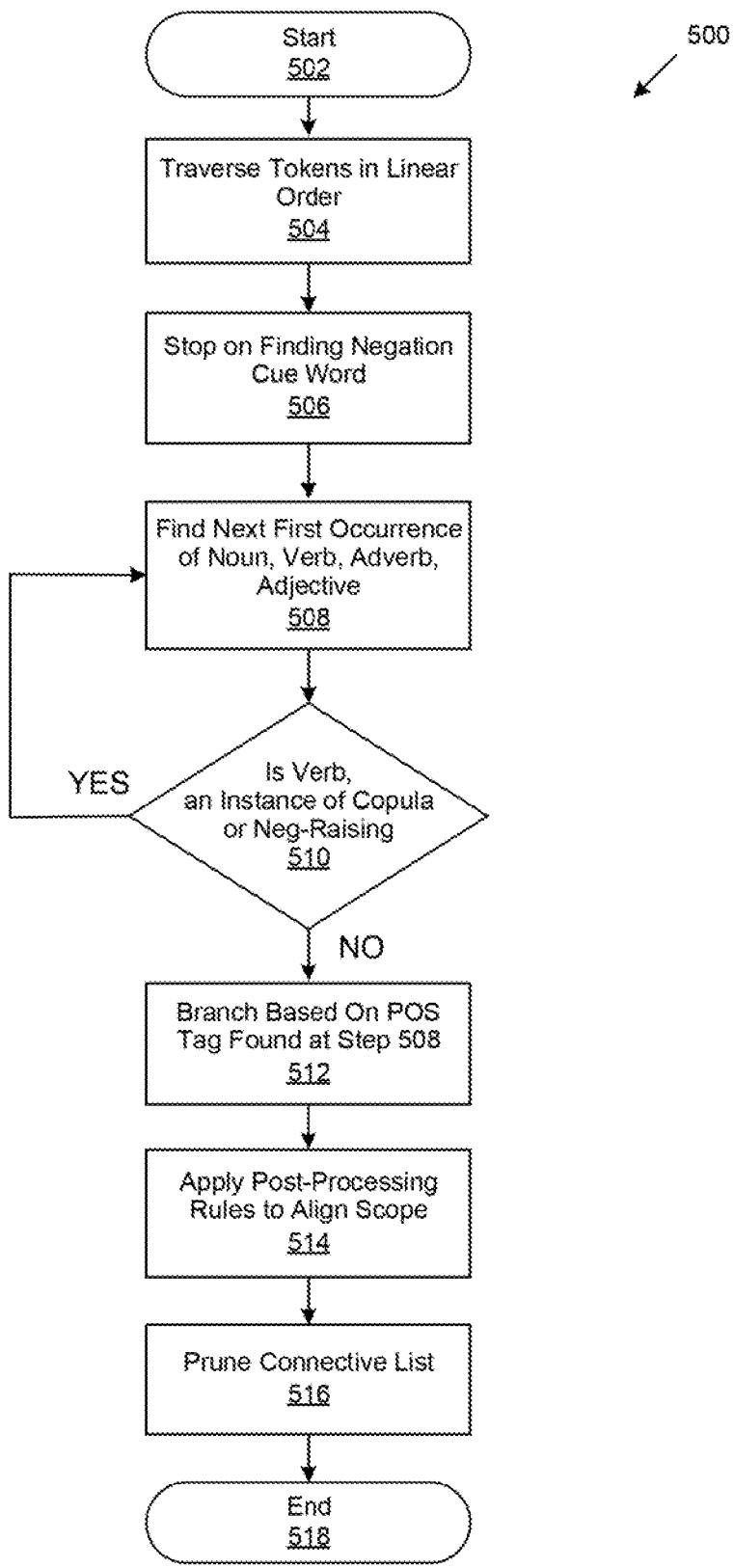
FIG. 5 is a generalized flow chart of the operation of scope detection.

Now referring to FIG. 5. FIG. 5 is a generalized flowchart 500 for scope detection. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, the process 500 starts. At step 504, the tokens (nodes, leaves) of a constituency parse tree are traversers in liner order. At step 506, the traversing is stopped when a negation cue word is found.

At step 508, the next first occurrence of a noun, verb, verb, or adjective is found. If a verb is found, and that verb is an instance of a copula verb or neg-raising verb, then following the YES branch of block 510, step 508 is performed. Otherwise, following the NO branch of block 510, the process 500 proceeds to step 512.

At step 512, branching is performed based on the POS tag found at step 508. For nouns and adjective, the following is performed.

For POS tags found at step 508 that are nouns and adjectives, traverse the constituency parse tree in an upward direction level by level until an ancestor/parent node with particular POS tag or label is found. For adjectives, the particular POS tag or label is "NP", "VP", "ADJP", "SBAR" or "S". For nouns, the particular POS tag or label is "NP", "SBAR" or "S". If a "PP", "VP", "ADVP", "SQ", "SINV" or "SBAR" is a right child node of the ancestor/parent node, then remove that child node. Get all the descendent/children nodes (leaves) as scope.

For POS tags found at step 508 that verbs and adverbs, traverse the constituency parse tree in an upward direction level by level until an ancestor/parent node with POS tag or label is found having of "VP", "SBAR" or "S". If a "SBAR", "SQ", or "SINV" is a right child node of the ancestor/parent node, then remove that child node. Get all the descendent/children nodes (leaves) as scope.

At 514, post-processing rules are applied to align scope. If the scope contains a connective from the prune connective list (see step 516), then delimit the scope before the connective word. If the scope contains a punctuation marker, then delimit the scope before the punctuation marker. Remove the negation cue word from the scope. Remove the scope words before the cue word, if any. If no scope is found after using these rules then predict a default scope regarding all the tokens (nodes, leaves) up to the first noun, adjective or verb. Include the tokens (nodes, leaves) after the negation cue word, up to the beginning of the predicted scope.

At step 516, pruning of connective list is performed. For example, the following words are pruned: "because", "while", "until", "however", "what", "but", "though", "although", "nothing", "nowhere", "whenever", "&", "and", "nonetheless", "whereas", "whose", "why", "where", "wherever". etc. At block 518, the process 500 ends.

Now referring back to FIG. 3, at step 310, an antonym-based sentiment is applied. Words in the negation scope are replaced by their antonyms. Negation is coupled with antonyms to get a better sentence representation for sentiment prediction. By using antonyms, out-of-vocabulary words can be reduced, as compared to merely prefixing a word with "not" for learning word representations. In other words, an antonym dictionary to the natural language processing (NLP) system. In particular, the antonym dictionary can be applied for sentiment analysis/prediction to a combination Convolutional Neural Network Long Short-Term Memory (CNN LSTM) architecture for sentiment analysis. A restricted and limited scope can be implemented as to antonym-based sentiment analysis to keep the original meaning of the content or text (sentence, statement). Predicted scopes are received from scope detection. The modified content or text (sentence, statement) can be passed to a machine learning (ML) model, such as the CNN LSTM, for sentiment analysis/prediction.

In certain implementations, steps 304 to 310 are preformed for each content or text (sentence, statement) to train and test a set.

At step 312, sentiment model is trained using the ML model, or CNN LSTM, and prediction is performed on the set (test set). At block 314, the process 300 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for improving sentiment detection based on applying an antonym dictionary to a natural language processing (NLP) system comprising:
   training a binary classifier to predict negation cues wherein a constituency parse tree is used to create rules for negation scope detection, moving in a linear order on the constituency parse tree;
   utilizing the trained binary classifier, a list of conversational negation terms, and a list of antonyms to annotate a content considering the negation cues and scope for the created rules; and
   traversing the constituency parse tree in an upward direction until a node or leaf is found with a desired category label, wherein the antonym dictionary is applied for sentiment analysis or prediction to a combination Convolution Neural Network Long Short-Term Memory architecture for sentiment analysis and a restricted and limited scope is implemented as to antonym based sentiment analysis to keep the original meaning of the content.

2. The method of claim 1, wherein the constituency parse tree is adjusted iteratively based on negation raising predicates, verbs, and scope assessments.

3. The method of claim 1, wherein the binary classifier is a Support Vector Machine (SVM).

4. The method of claim 1, wherein in predicting negation cues, false detection is considered.

5. The method of claim 1 further comprising performing sentiment analysis on the annotated content.

6. The method of claim 5, where the sentiment analysis is performed by a machine learning (ML) model.

7. The method of claim 6, wherein the ML is a Convolutional Neural Network Long Short-Term Memory (CNN LSTM).

8. A system comprising:
   a processor;
   a data bus coupled to the processor; and
   a computer-usable medium embodying computer program code, the computer-usable medium being coupled to the data bus, the computer program code used for improving sentiment detection based on applying an antonym dictionary to a natural language processing (NLP) system and comprising instructions executable by the processor and configured for:
   training a binary classifier to predict negation cues wherein a constituency parse tree is used to create rules for negation scope detection, moving in a linear order on the constituency parse tree;
   utilizing the trained binary classifier, a list of conversational negation terms, and a list of antonyms to annotate a content considering the negation cues and scope for the created rules; and
   traversing the constituency parse tree in an upward direction until a node or leaf is found with a desired category label, wherein the antonym dictionary is applied for sentiment analysis or prediction to a combination Convolution Neural Network Long Short-Term Memory architecture for sentiment analysis and a restricted and limited scope is implemented as to antonym based sentiment analysis to keep the original meaning of the content.

9. The system of claim 8, wherein the constituency parse tree is adjusted iteratively based on negation raising predicates, verbs, and scope assessments.

10. The system of claim 8, wherein the binary classifier is a Support Vector Machine (SVM).

11. The system of claim 8, wherein in predicting negation cues, false detection is considered.

12. The system of claim 8 further comprising performing sentiment analysis on the annotated content.

13. The system of claim 12, wherein the sentiment analysis is performed by a Machine Learning (ML) model.

14. A non-transitory, computer-readable storage medium embodying computer program code, the computer program code comprising computer executable instructions configured for:
   training a binary classifier to predict negation cues wherein a constituency parse tree is used to create rules for negation scope detection, moving in a linear order on the constituency parse tree;
   utilizing the trained binary classifier, a list of conversational negation terms, and a list of antonyms to annotate a content considering the negation cues and scope for the created rules; and
   traversing the constituency parse tree in an upward direction until a node or leaf is found with a desired category label, wherein the antonym dictionary is applied for sentiment analysis or prediction to a combination Convolution Neural Network Long Short-Term Memory architecture for sentiment analysis and a restricted and limited scope is implemented as to antonym based sentiment analysis to keep the original meaning of the content.

15. The non-transitory, computer-readable storage medium of claim 14, wherein the constituency parse tree is adjusted iteratively based on negation raising predicates, verbs, and scope assessments.

16. The non-transitory, computer-readable storage medium of claim 14, wherein in predicting negation cues, false detection is considered.

17. The non-transitory, computer-readable storage medium of claim 14, further comprising performing sentiment analysis on the annotated content by a machine learning (ML) model.

18. The non-transitory, computer-readable storage medium of claim 14, further comprising performing sentiment analysis on the annotated content by a Machine Learning (ML) model.

19. The non-transitory, computer-readable storage medium of claim 14, wherein the computer executable instructions are deployable to a client system from a server system at a remote location.

20. The non-transitory, computer-readable storage medium of claim 14, wherein the computer executable instructions are provided by a service provider to a user on an on-demand basis.

* * * * *